US008676725B1

(12) United States Patent
Lin et al.

(10) Patent No.: US 8,676,725 B1
(45) Date of Patent: Mar. 18, 2014

(54) METHOD AND SYSTEM FOR ENTROPY-BASED SEMANTIC HASHING

(75) Inventors: Ruei-Sung Lin, Mountain View, CA (US); David Ross, San Jose, CA (US); Jay Yagnik, Mountain View, CA (US)

(73) Assignee: Google Inc., Mountain View, CA (US)

(*) Notice: Subject to any disclaimer, the term of this patent is extended or adjusted under 35 U.S.C. 154(b) by 680 days.

(21) Appl. No.: 12/794,380

(22) Filed: Jun. 4, 2010

Related U.S. Application Data

(60) Provisional application No. 61/184,629, filed on Jun. 5, 2009.

(51) Int. Cl.
*G06F 15/18* (2006.01)

(52) U.S. Cl.
USPC .............................................. 706/12; 706/14

(58) Field of Classification Search
None
See application file for complete search history.

(56) References Cited

U.S. PATENT DOCUMENTS

| 7,949,186 | B2* | 5/2011 | Grauman et al. ............. 382/170 |
| 8,213,689 | B2 | 7/2012 | Yagnik et al. |

OTHER PUBLICATIONS

C. Chu, S. Kim, Y. Lin, Y. Yu, G. Bradski, A. Y. Ng, and K. Olukotun. Map-reduce for machine learning on multicore. In NIPS '07: Proceedings of Twenty-First Annual Conference on Neural Information Processing Systems. Neural Information Processing Systems Foundation, 2007.*

M. Charikar. Similarity estimation techniques from rounding algorithms. In Proceedings of the 34th Annual ACM Symposium on Theory of Computing, pp. 380-388, 2002.*
Y. Weiss, A. Torralba, and R. Fergus. Spectral hashing. In NIPS, Dec. 2008.*
Xiang-song Hou; Cao Yuan-da; Zhi-tao Guan; , "A Semantic Search Model based on Locality-sensitive Hashing in mobile P2P," Advanced Communication Technology, 2008. ICACT 2008. 10th International Conference on , vol. 3, no., pp. 1635-1640, Feb. 17-20, 2008.*
Scheidat T, Vielhauer C: Biometric hashing for handwriting: entropy based feature selection and semantic fusion. Proc of SPIE 2008.*
A. Andoni, M. Datar, N. Immorlica, P. Indyk, and V. Mirrokni. Locality-sensitive hashing scheme based on p-stable distributions. Nearest Neighbor Methods for Learning and Vision, Neural Processing Information Series, MIT Press, 2005.*
R. R. Salakhutdinov and G. E. Hinton. Semantic hashing. In SIGIR workshop on Information Retrieval and applications of Graphical Models, 2007.*
Malik, Hassan Haider; Kender, John Ronald. WO/2008/154029.*

(Continued)

*Primary Examiner* — Kakali Chaki
*Assistant Examiner* — Daniel Pellett
(74) *Attorney, Agent, or Firm* — Sterne, Kessler, Goldstein & Fox P.L.L.C.

(57) ABSTRACT

Methods, systems and articles of manufacture for identifying semantic nearest neighbors in a feature space are described herein. A method embodiment includes generating an affinity matrix for objects in a given feature space, wherein the affinity matrix identifies the semantic similarity between each pair of objects in the feature space, training a multi-bit hash function using a greedy algorithm that increases the Hamming distance between dissimilar objects in the feature space while minimizing the Hamming distance between similar objects, and identifying semantic nearest neighbors for an object in a second feature space using the multi-bit hash function. A system embodiment includes a hash generator configured to generate the affinity matrix and train the multi-bit hash function, and a similarity determiner configured to identify semantic nearest neighbors for an object in a second feature space using the multi-bit hash function.

14 Claims, 11 Drawing Sheets

(56) References Cited

OTHER PUBLICATIONS

Wang, Bin, et al. "Large-scale duplicate detection for web image search." Multimedia and Expo, 2006 IEEE International Conference on. IEEE, 2006.*

Lin et al., "SPEC Hashing: Similarity Preserving algorithm for Entropy-based Coding," 2010 IEEE Conference on Computer Vision and Pattern Recognition (CVPR), Jun. 13-19, 2010, pp. 848-854.

Bentley, Jon, "K-d Trees for Semidynamic Point Sets," In SCG '90: Proceedings of the Sixth Annual Symposium on Computational Geometry, Published in 1990; pp. 187-197.

Datar et al., "Locality-Sensitive Hashing Scheme Based on p-Stable Distributions," In SCG '04: Proceedings of the Twentieth Annual Symposium on Computational Geometry, Jun. 9-11, 2004; pp. 253-262.

Jain et al., "Fast Image Search for Learned Metrics," In Proceedings of the IEEE Conference on Computer Vision and Pattern Recognition (CVPR), Jun. 2008; pp. 1-8.

Ke et al., "Computer Vision for Music Identification: Video Demonstration," IEEE Computer Society Conference on Computer Vision and Pattern Recognition, CVPR 2005, vol. 2, Jun. 20-25, 2005; 1 page.

Meila et al., "Learning Segmentation by Random Walks," In Advances in Neural Information Processing Systems, Published in 2001; pp. 873-879.

Phillips et at., "FRVT 2006 and ICE 2006 Large-Scale Results," Technical Report NISTIR 7408, National Institute of Standards and Technology, Published Mar. 2007; pp. 1-55.

Raginsky et al., "Locality-Sensitive Binary Codes from Shift-Invariant Kernels," In Advances in Neural Information Processing Systems 22, Published in 2009; pp. 1-9.

Rahimi et al., "Random Features for Large-Scale Kernel Machines," In Advances in Neural Information Processing Systems 22, Published in 2009; pp. 1-8.

Shakhnarovich et al., "Fast Pose Estimation with Parameter-Sensitive Hashing," Ninth IEEE International Conference on Computer Vision, vol. 2, Published Oct. 13-16, 2003; pp. 1-9.

Torralba et al., "Small Codes and Large Image Databases for Recognition," In Computer Vision and Pattern Recognition, Published in 2008; pp. 1-8.

Wang et al., "AnnoSearch: Image Auto-Annotation by Search," Proceedings of the 2006 IEEE Computer Society Conference on Computer Vision and Pattern Recognition (CVPR'06), Published in 2006; pp. 1-8.

Yagnik et al., "Learning People Annotation from the Web via Consistency Learning," In Proceedings of the International Workshop on Multimedia Information Retrieval, Published Sep. 28-29, 2007; pp. 285-290.

Yang et al., "Unifying Discriminative Visual Codebook Generation with Classifier Training for Object Category Recognition," In Computer Vision and Pattern Recognition, Published in 2008; pp. 1-8.

Zhao et al., "Large Scale Learning and Recognition of Faces in Web Videos," In Proceedings of: Automatic Face & Gesture Recognition, FG '08 8th IEEE, Published in 2008; pp. 1-7.

Wang et al., "Large-Scale Duplicate Detection for Web Image Search," ICME 2006, Published in 2006; pp. 353-356.

* cited by examiner

|   | a     | b     | c     |
|---|-------|-------|-------|
| A | (A,a) | (A,b) | (A,c) |
| B | (B,a) | (B,b) | (B,c) |
| C | (C,a) | (C,b) | (C,c) |

FIG. 7

METHOD AND SYSTEM FOR ENTROPY-BASED SEMANTIC HASHING

CROSS-REFERENCE TO RELATED APPLICATION

This patent application claims the benefit of U.S. Provisional Patent Application No. 61/184,629, filed Jun. 5, 2009, entitled "Method and System For Entropy-Based Semantic Hashing," which is incorporated herein by reference in its entirety.

BACKGROUND

1. Field

Embodiments of the present invention relate to identifying semantic nearest neighbors in a feature space.

2. Related Art

With the advance of the Internet, there is an abundance of data of images, documents, music, videos, etc. As the size of the data continues to grow, the density of similar objects in the data space also increases. These objects are likely to have similar semantics. As a result, inferences based on nearest neighbors or objects can be more reliable than before.

Traditional methods for searching nearest neighbors in sub-linear time, such as the KD-tree, work well on data with limited feature dimensionality, but become linear in time as dimensionality grows. Recently, Locality Sensitive Hashing (LSH) has been successfully applied to datasets with high dimensional features. LSH uses random projections to map objects from feature space to bits, and treats those bits as keys for multiple hash tables. As a result, collision of similar samples in at least one hash bucket has a high probability. This randomized LSH algorithm has a tight asymptotic bound, and provides the foundation to a number of algorithmic extensions.

Parameter sensitive hashing is one such extension. It chooses a set of weak binary classifiers to generate bits for hash keys. The classifiers are selected according to the criteria that nearby objects in a dataset are more likely to have a same class label than more distant objects. A major drawback of this type of approach is the requirement of evaluation on object pairs, which has size quadratic to the number of objects. Hence, its scalability to larger scale datasets is limited.

Restricted Boltzmann machines (RBM) have also been used to learn hash functions, and have been used to show that the learned hash codes preserve semantic similarity in Hamming space. Training RBM is a computationally intensive process that makes it very costly to retrain the hash function when data evolves.

Spectral hashing takes a completely different approach to generate hash code. Spectral hashing first rotates feature space to statistically orthogonal axes using principal component analysis (PCA). Then, a special basis function is applied to carve each axis independently to generate hash bits. As a result, bits in a hash code are independent, which leads to a compact representation with short code length. Experiments show that spectral hashing outperforms RBM. However, spectral hashing is developed on the assumption that objects are spread in a Euclidean space with a particular distribution—either uniform or Gaussian. This is seldom true in a real world data set.

BRIEF SUMMARY

Embodiments relate to methods and systems for identifying semantic nearest neighbors for an object in a feature space. A method embodiment includes generating an affinity matrix for objects in a given feature space, wherein the affinity matrix identifies the semantic similarity between each pair of objects in the feature space, training a multi-bit hash function using a greedy algorithm that increases the Hamming distance between dissimilar objects in the feature space while minimizing the Hamming distance between similar objects, and identifying semantic nearest neighbors for an object in a second feature space using the multi-bit hash function. A system embodiment includes a hash generator configured to generate the affinity matrix and configured to train the multi-bit hash function, and a similarity determiner configured to identify semantic nearest neighbors for an object in a second feature space using the multi-bit hash function.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIG. 7 illustrates exemplary pairs of affinity matrix blocks and hypothesis lists, according to an embodiment.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments relate to methods and systems for identifying semantic nearest neighbors for an object in a feature space. In an embodiment, the affinity matrix of a training data set is used to train a hash function such that the Hamming distances correlate to the similarities specified in the affinity matrix. The hash function may be a collection of bit functions, and training the hash function is a greedy process that incrementally selects bit functions to expand the hash code.

In an embodiment, the hash function selects an initial bit function by minimizing a graph cut under a normalization constraint. For a sparse affinity matrix, computing the graph cut may take linear time. The normalization constraint has square complexity in computation, but embodiments also provide an approximate linear time solution. Embodiments provide an approximate linear time solution by minimizing the graph cut while maximizing conditional entropy on each pair of bit functions. Such approximation can improve the learning time of the algorithm. In addition, because of constraints on conditional entropies, the generated hash codes have small mutual information and, therefore, are compact.

In an embodiment, a trained hash function maps objects to binary vectors such that neighboring objects (i.e., objects with similar semantics) have small Hamming distances between their representative binary vectors, while irrelevant objects have large Hamming distances between their binary vectors. Therefore, these binary vectors can be used for fast semantic nearest-neighbor retrieval. In an embodiment, training the hash function takes time linear to the data size. This makes the hash function feasible to tasks with an evolving dataset, in which periodically updating or re-training the hash function is required.

System

Figure 1:
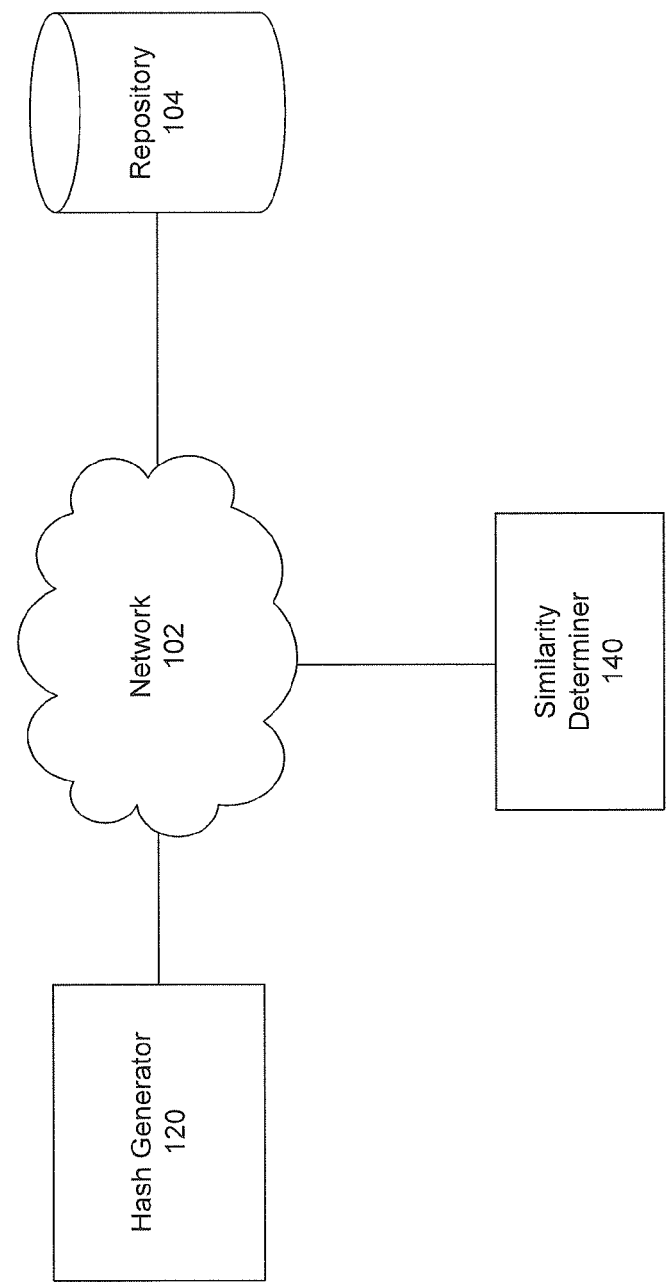
FIG. 1 illustrates a system for identifying semantic nearest neighbors for an object in a feature space, according to an embodiment.

This section describes a system for identifying semantic nearest neighbors for an object in a feature space, according to an embodiment of the invention illustrated in FIG. 1. FIG. 1 is a diagram of system 100 for identifying semantic nearest neighbors for an object in a feature space, according to an embodiment. While the following is described in terms of data that includes images, the invention is not limited to this embodiment. Embodiments of the invention can be used in conjunction with any other form of data such as video, audio and textual data. For example, embodiments of the invention can be used in any system having generally the structure of FIG. 1, or that would benefit from the operation, methods and functions as described herein. The term 'feature' as used herein may be any form of feature or feature descriptor used to represent images, text, video, audio and/or their characteristics.

System 100 includes hash generator 120, similarity determiner 140 and repository 104. Repository 104 includes a plurality of data sets. Such data sets can include, but are not limited to, digital images, text, video and other forms of data. Such data can be multi-dimensional or even single dimensional data. Data sets in repository 104 may also include image statistics (histograms of color or texture). In an embodiment, hash generator 120 generates hashing functions using the data sets present in repository 104. In an embodiment, similarity determiner 140 determines similarity between data sets present in repository 104 using the hashing functions generated by hash generator 120. The operation of hash generator 120 is described further below.

In an embodiment, hash generator 120, similarity determiner 140 and repository 104 may be implemented on, among other things, any device that can retrieve, download or view digital image (or other data) from any form of a network 102. Such a device can include, but is not limited to, a personal computer, mobile device such as a mobile phone, workstation, embedded system, game console, television, set-top box, or any other computing device that can support image viewing or image retrieval. Such a device includes, but is not limited to, a device having a processor and memory for executing and storing instructions. Such a device may include software, firmware, and hardware or some combination thereof. The software may include one or more applications and an operating system. The hardware can include, but is not limited to, a processor, memory and user interface display. An optional input device, such as a mouse or other pointing device, may be used. Furthermore, for example, embodiments of the present invention may be implemented in a lookup platform of a face recognition system or other image or video retrieval system.

Figure 2:
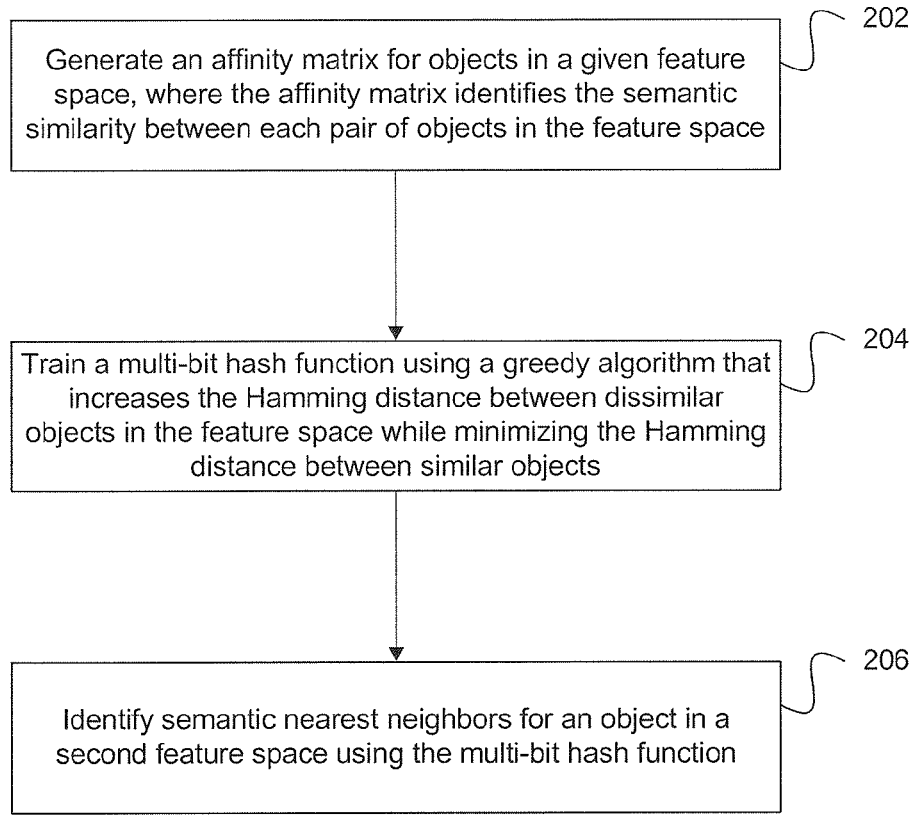
FIG. 2 is a flowchart of a method of identifying semantic nearest neighbors for an object in a feature space, according to an embodiment.

FIG. 2 illustrates an exemplary overall operation of the system described in FIG. 1. FIG. 2 is a flowchart of a method 200 for identifying semantic nearest neighbors for an object in a feature space, according to an embodiment of the present invention.

In step 202, an affinity matrix is generated for objects in a given feature space, where the affinity matrix identifies the semantic similarity between each pair of objects in the feature space. As an example, hash generator 120 may generate an affinity matrix using objects or data stored in repository 104. Also, for example, if the objects have labels, the affinity can be set to a value '1' for all pairs of objects with matching labels, and can be set to a value of '0' otherwise. Thus, for example, if the objects are images of faces, and the labels are the name of the person depicted, two images of 'John Doe' would have affinity 1, while an image of 'John' and an image of 'Jane' would have affinity 0. In another example to generate an affinity matrix, the Euclidean distance between the objects in repository 104 can be computed. This computed value can then be negated in order to convert the Euclidean distance into an affinity.

In step 204, a multi-bit hash function is trained using a greedy algorithm that increases the Hamming distance between dissimilar objects in the feature space while minimizing the Hamming distance between similar objects. As an example, hash generator 120 can train a multi-bit hash function using a greedy algorithm and the affinity matrix generated in step 202.

In step 206, the multi-bit hash function is used to identify semantic nearest neighbors for an object in a second feature space. As an example, similarity determiner 140 can use the multi-bit hash function to identify semantic nearest neighbors for an object in a second feature space. Each of these steps will be further described below.

I. Hash Learning

In an embodiment, a similarity preserving hash function is trained by hash generator 120 using a given training set $\{x_i\}_I$ and affinity matrix S of the training set. This hash function maps objects from the feature space to a Hamming space such that objects with high similarity measures will have small Hamming distances.

As a purely illustrative non-limiting example, consider $B_T$ as a T-bit hash function. In an exemplary model, $B_T$ is a collection of T binary functions: $B_T(x)=\{b_1(x), b_2(x), \ldots, b_T(x)\}$ with $b_i(x) \in \{0,1\}$. $d_k(i,j)$ is the distance based on $b_k$. Furthermore, $d_k(i,j)=1$, if $b_k(x_i) \neq b_k(x_j)$ and else, $d_k(i,j)=0$. $H_T(i,j)$ is the Hamming distance between two hash codes generated by $B_T$. Therefore, $$H_T(i, j) = \sum_{k=1}^{T} d_k(i, j).$$

In the affinity matrix created by step 202 in FIG. 2, $S_{ij}$ can represent the semantic similarity between object i and j ($S_{ij} \geq 0$). Furthermore, $S_{ij}=0$ indicates that objects in pair (i,j) are dissimilar. Because every object is expected to be related to a small number of objects, S is a sparse matrix.

In an embodiment, the hash learning problem is formulated by hash generator 120 as a distribution learning process. First, hash generator 120 normalizes S to $\Sigma_{i,j} S_{ij} = 1$, and treats S as the target distribution. In an embodiment, hash generator 120 defines another distribution $W_{(T)}$ using Hamming distance $H_T$. Thus, $$W_{ij}^{(T)} = \frac{1}{Z_T} e^{-\lambda H_T(i,j)}, \quad \text{with } Z_T = \sum_{i,j} e^{-\lambda H_T(i,j)},$$

By making distribution $W^{(T)}$ close to a target distribution, objects with large similarity values will have relatively small Hamming distances, and vice versa. As a result, hash function $B_T$ can be learned by minimizing the Kullback-Leibler divergence, i.e., $K L(S \| W^{(T)})$. The Kullback-Leibler divergence is known to those skilled in the art and is a non-symmetric measure of the difference between two probability distributions.

Because S is fixed, minimizing the Kullback-Leibler divergence is equivalent to minimizing the cross entropy, i.e., $$\min_{B_T} J_T = -\sum_{i,j} \lambda S_{ij} \log W_{ij}^{(T)} = \lambda \sum_{i,j} S_{ij} H_T(i,j) + \log \sum_{k,l} e^{-\lambda H_T(k,l)} \quad (1)$$

Without loss of generality and to facilitate the description of the method, $\lambda$ is set to be 1 in the following derivations.

Greedy Algorithm

Directly optimizing (1) is a challenging task, especially when $B_T$ has a large hypothesis space. In this scenario, a greedy approach is adopted by hash generator 120 to accomplish, for example, step 204 of method 200. In an embodiment, hash generator 120 accomplishes a greedy approach by factorizing (1) into a recursive equation. By factorizing (1) into a recursive equation, a sub-optimal algorithm is obtained that incrementally learns the hash function one bit at a time. In this way, $$\text{sum}(H_k) = \Sigma_{ij} e^{-H_k(i,j)}$$

and $$\text{cut}_s(b_l) = \Sigma_{i,j} S_{ij} d_l(i,j) = \Sigma_{i,j; b_l(i) \neq b_l(j)} S_{ij}.$$

This choice of naming will be explained further in the following section.

Therefore, $J_T$ (from (1)) can be rewritten as:

$$J_T = \sum_{i,j} S_{ij} \sum_{t=1}^{T} d_t(i,j) + \text{logsum}(H_T) \quad (2)$$

$$= \sum_{t=1}^{T} \text{cut}_S(b_t) + \text{logsum}(H_T)$$

$$= J_{T-1} + \text{cut}_S(b_T) + \text{logsum}(H_T) - \text{logsum}(H_{T-1})$$

Let $$\text{cut}(H_k, b_l) = \Sigma_{i,j; b_l(x_i) \neq b_l(x_j)} e^{-H_k(i,j)} \Sigma_{i,j; d_l(i,j)=1} e^{-H_k(i,j)}.$$

Thus, the following equation can be derived:

$$\sum_{i,j; d_l(i,j)=0} e^{-H_k(i,j)} = \sum_{i,j; b_l(i,j)=b_l(j)} e^{-H_k(i,j)} = \text{sum}(H_k) - \text{cut}(H_k, b_l)$$

Using this property and $H_T(i,j) = H_{T-1}(i,j) + d_T(i,j)$, $\text{sum}(H_T)$ can be factorized as:

$$\text{sum}(H_T) = \sum_{i,j; d_T(i,j)=0} e^{-H_{T-1}(i,j)} + \sum_{i,j; d_T(i,j)=1} e^{-(H_{T-1}(i,j)+1)} \quad (3)$$

$$= \text{sum}(H_{T-1}) - \text{cut}(H_{T-1}, b_T) + e^{-1} \text{cut}(H_{T-1}, b_T)$$

Putting (2) and (3) together provides:

$$L_T = J_T - J_{T-1} = \text{cut}_S(b_T) + \log\left(1 - (1 - e^{-1}) \frac{\text{cut}(H_T, b_T)}{\text{sum}(H_{T-1})}\right)$$

$L_T$ represents the 'improvement' from adding binary function $b_T$ to the hash function $B_{T-1}$. If $L_T$ is negative, adding $b_T$ is favorable because it further reduces the cross entropy defined in (1).

Based on this result, the hash function can be learned by hash generator 120 by incrementally selecting new binary functions to expand the hash code. The learning algorithm is formalized as follows:

1. Starting with t=0, initialize an empty hash function $B_0$.
2. Find binary function $b_{t+1}$ that minimizes:

$$\min_{b_{t+1}} L_{t+1} = \text{cut}_s(b_{t+1}) + \log\left(1 - (1 - e^{-1}) \frac{\text{cut}(H_t, b_{t+1})}{\text{sum}(H_t)}\right) \quad (4)$$

3. Set $B_{t+1} = \{B_t, b_{t+1}\}$ and increment t by one. Repeat step 2 until either the desired code length is reached or no candidate for $b_{t+1}$ has negative $L_{t+1}$. In an embodiment, steps (1)-(3), may be performed by hash generator 120.

Figure 3:
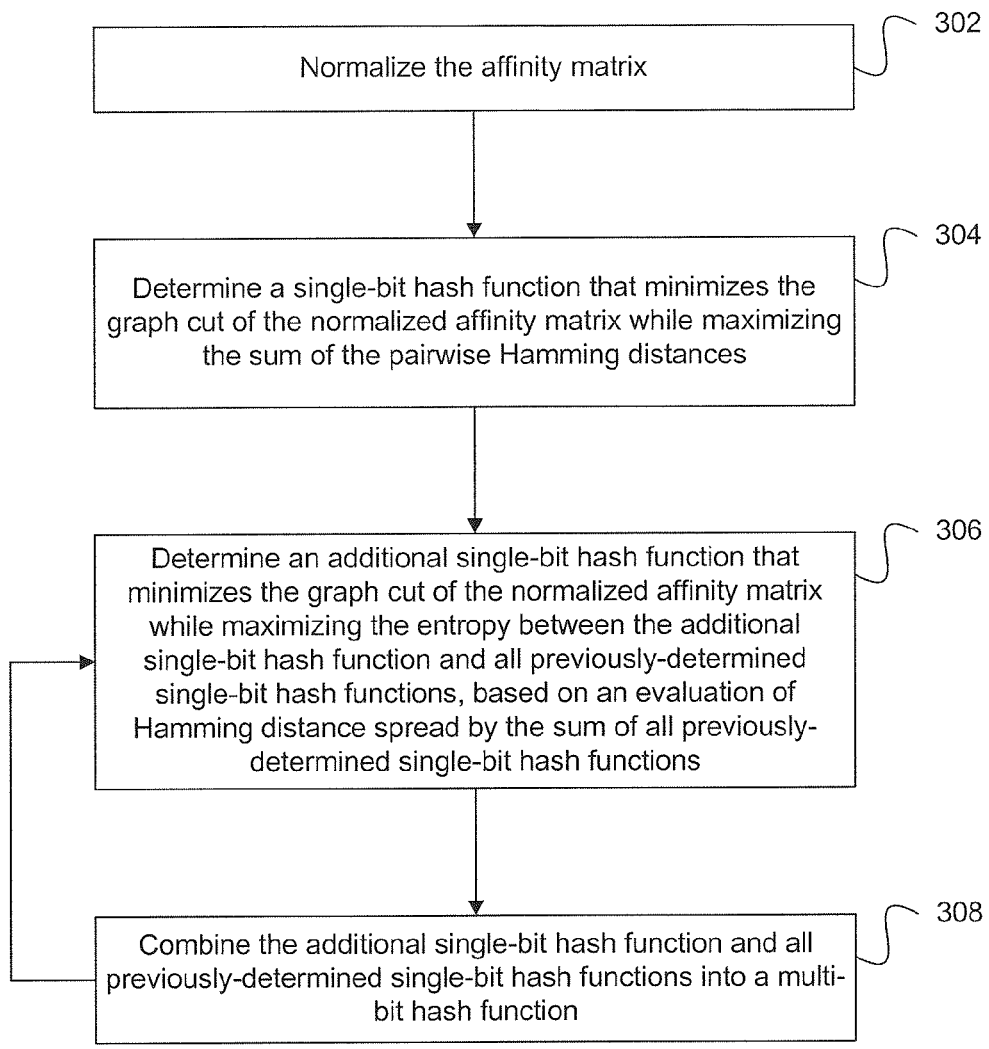
FIG. 3 is a flowchart of a method for training a hash function, according to an embodiment.

A method by which the greedy algorithm can be trained is described in FIG. 3. FIG. 3 is a flowchart of a method for training a hash function according to an embodiment.

In step 302, a generated affinity matrix is normalized. As an example, the affinity matrix generated in step 202 of flowchart 200 can be normalized by hash generator 120.

In step 304, a single-bit hash function is determined that minimizes the graph cut of the normalized affinity matrix while maximizing the sum of the pairwise Hamming distances. As an example, hash generator 120 determines a single bit hash function using the affinity matrix normalized in step 302.

In step 306, an additional single-bit hash function is determined that minimizes the graph cut of the normalized affinity matrix while maximizing the entropy between the additional single-bit hash function and all previously-determined single-bit hash functions, based on an evaluation of Hamming distance spread by the sum of all previously-determined single-bit hash functions.

In step 308, the additional single-bit hash function and all previously-determined single-bit hash functions are combined into a multi-bit hash function. As an example, hash generator 120 may combine the additional single-bit hash function and all previously-determined single-bit hash functions into a multi-bit hash function. In an embodiment, once step 308 is performed, method 300 returns to step 306 and continues to perform steps 306 and 308 until a specified number of bits are included in the multi-bit hash function.

Analysis

According to (4), binary function $b_{t+1}$ induces small $\text{cut}_S$ $(b_{t+1})$ and large $\text{cut}(H_T, b_{t+1})$. This can be reasoned as follows.

$$\text{cut}_S(b_{t+1}) = \Sigma_{i,j;b_{t+1}(i) \neq b_{t+1}(j)} S_{ij}$$

is the total loss of assigning similar objects to different binary code in $b_{t+1}$. This term is minimized when similar objects are assigned the same binary code. In an embodiment, taken in isolation, $\text{cut}_S(b_{t+1})$ can be trivially minimized by hash generator 120 by assigning all objects the same label, collapsing all Hamming distances to zero.

On the other hand, in order to have large value in $$\text{cut}(H_t, b_{t+1}) = \Sigma_{i,j;b_{t+1}(x_i) \neq b_{t+1}(x_j)} e^{-t(i,j)},$$

$b_{t+1}$ should assign different codes to as many pairs (i,j), especially those with small Hamming distance $H_T(i,j)$. This countervailing force is referred to as the Hamming-distance spread, and is measured by $$\text{cut}(H_t, b_{t+1})/\text{sum}(H_t) \leq 1$$

The larger its value is, the better the spread.

Combining (5) and (6), the greedy algorithm performed by hash generator 120 incrementally adds bits to the hash function to increase the Hamming distance between dissimilar objects while keeping the Hamming distance between similar objects small.

Figure 4:
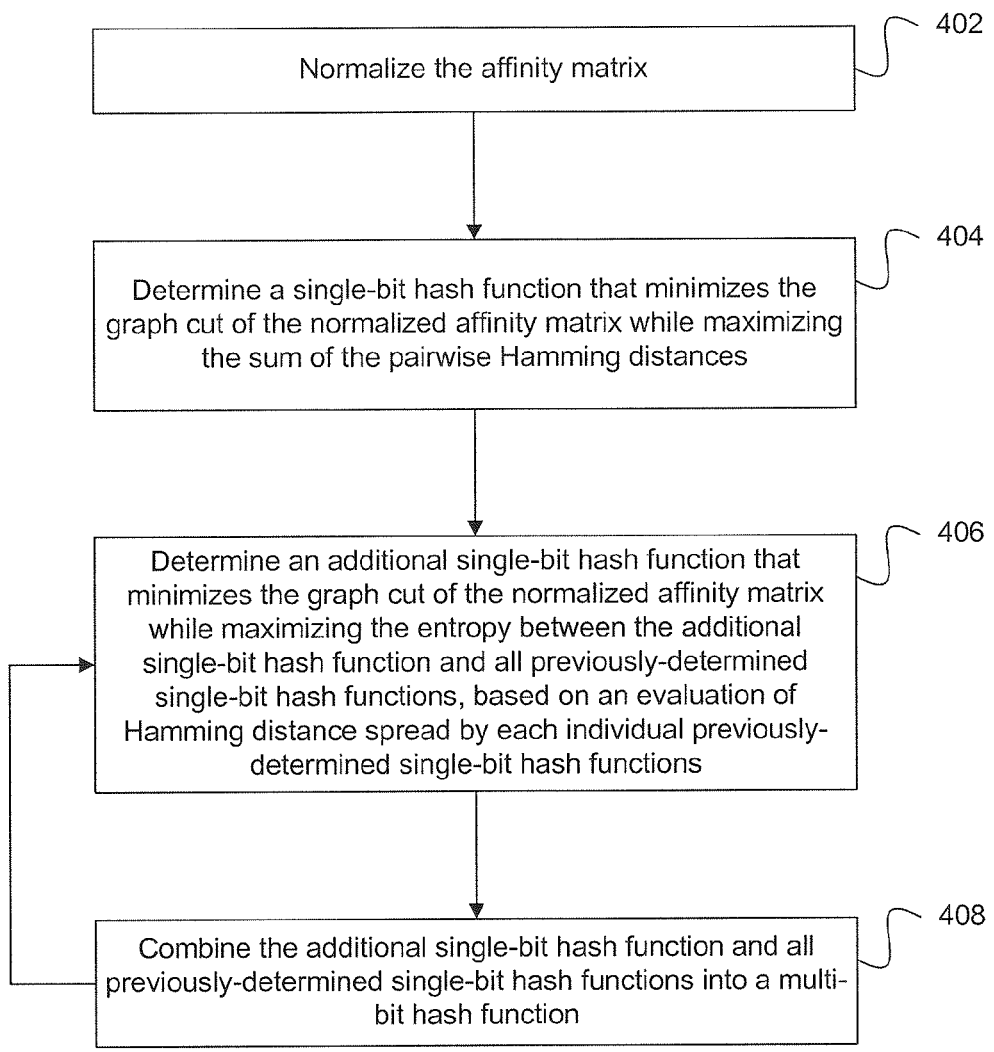
FIG. 4 is a flowchart of a method for training a hash function, according to another embodiment.

A method in accordance with such a greedy algorithm is further detailed in FIG. 4.

II. Approximate Algorithms

The greedy algorithm described above may be simple, but exactly computing (4) has an inherited quadratic cost. It requires computing $H_T(i,j)$ for every possible (i,j), and constantly updating those values as t increases. This makes the hash learning algorithm intractable for large datasets.

In an embodiment, two fast linear time approximate algorithms can instead be used by hash generator 120 to accomplish, for example, step 106 of method 100, neither of which compute $H_T$. Instead, the first approximate algorithm uses the property $$H_t(i, j) = \sum_{k=1}^{t} d_k(i, j)$$

and measures $b_{t+1}$ against each $d_k$ (i.e., pairwise Hamming distance) separately. In contrast, the second approximate algorithm allows hash generator 120 to evaluate the conditional entropy of bit $b_{t+1}$ with each of the previously-learned bits. Before describing the approximate algorithms, it is helpful to look at the computation of (4) for the case of two-bit hash code, that is $b_{t+1} = b_2$.

Case with 2-Bit Hash Code

When t+1=2, hash generator may efficiently compute (4). According to (2), $$\min_{b_2} L_2 = \text{cut}_S(b_2) + \text{logsum}(H_2) - \text{logsum}(H_1) \qquad (5)$$

Denote N as the number of total training objects and $N_1$ the number of objects with $b_1(x)=1$. It can be proved that, $$\text{sum}(H_1) = \sum_{i,j;b_1(i)=b_1(j)} e^0 + \sum_{i,j;b_1(i) \neq b_1(j)} e^{-1}$$
$$= N_1^2 + (N - N_1)^2 + 2N_1(N - N_1)e^{-1}$$

Now let $N_{11}$ be the number of samples with $b_1(x)=1$ and $b_2(x)=1$, $N_{11} \leq N_1$. Similarly, $N_{10}$ is the number of samples with $b_1(x)=0$ and $b_2(x)=1$. $\text{sum}(H_2)$ can be computed using only $N$, $N_1$, $N_{11}$, and $N_{10}$:

$$\text{sum}(H_2) =$$
$$\sum_{i,j;H_2(i,j)=0} e^0 + \sum_{i,j;H_2(i,j)=1} e^{-1} + \sum_{i,j;H_2(i,j)=2} e^{-2} = N_{11}^2 + (N_1 - N_{11})^2 + N_{10}^2 +$$
$$(N_0 - N_{10})^2 + 2e^{-1}(N_{11}(N_1 - N_{11}) + N_{10}(N_0 - N_{10}) + N_{11}N_{10} +$$
$$(N_1 - N_{11})(N_0 - N_{10}))2e^{-2}(N_{11}(N_0 - N_{10}) + N_{10}(N_1 - N_{11}))$$

Using the equations above, $L_2$ can be computed by hash generator 120 without explicitly computing $H_2(i,j)$. In addition, because it only takes linear time to get the counts of $N_1$, $N_{11}$, and $N_{10}$, this method is a linear time algorithm.

Equation (5) can also be written as:

$$\min_{b_2} L_2 = \text{cut}_S(b_2) + \log\left(1 - (1 - e^{-1})\frac{\text{cut}(H_1, b_2)}{\text{sum}(H_1)}\right) \qquad (6)$$

As is pointed out above, $$\text{cut}(H_1, b_2)/\text{sum}(H_t)$$

is the Hamming distance spread that $b_2$ has induced to $H_1$. Increasing the spread reduces $L_2$.

SPEC-Spread Algorithm

According to (4), selecting $b_{t+1}$ depends on $$\text{cut}(H_t, b_{t+1})/\text{sum}(H_t)$$

which has quadratic computational complexity. In an embodiment, hash generator 120 uses an approximate algorithm that avoids this computation. The algorithm is based on the result for two-bit hash code, and measures $b_{t+1}$ against every bit in $H_t$ separately.

For notational convenience, $\text{sum}(H_t)$ is rewritten as $\text{sum}(B_t)$. This is valid because Hamming distance $H_t$ is determined by hash function $B_t$. Similarly, $$\text{sum}(\{b_k, b_1\}) = \Sigma_{i,j} e^{-(d_k(i,j) + d_1(i,j))}$$

is denoted as the sum of the 2-bit hash function $\{b_k, b_1\}$. Given current hash function $B_t = \{b_1, \ldots, b_t\}$, hash generator 120 decomposes $B_t$ into a set of 1-bit hash functions and measures the improvement $b_{t+1}$ induces on each of these hash functions. The selection of $b_{t+1}$ is according to the following criterion:

$$\min_{b_{t+1}} \hat{L}_{t+1} = \max_{b_k \in B_t} \{\text{cut}_S(b_{t+1}) + \text{logsum}(\{b_k, b_{t+1}\}) - \text{logsum}(\{b_k\})\} \qquad (7)$$

Applying (6) to (7), $$\min_{b_{t+1}} \hat{L}_{t+1} = \text{cut}_S(b_{t+1}) + \log\left(1 - \min_{b_k \in B_t} \frac{\text{cut}(d_k, b_{t+1})}{\text{sum}(\{b_k\})}\right) \quad (8)$$

$\text{cut}(d_k, b_{t+1})/\text{sum}(\{b_k\})$ is the measurement of Hamming-distance spread that $b_{t+1}$ induces on each of these 1-bit hash functions. By applying $\min_{b_k \in B_t}$, a lower bound on the Hamming-distance spread results. Therefore, $$\min_{b_k \in B_t} \text{cut}(d_k, b_{t+1})/\text{sum}(\{b_k\})$$

is a heuristic approximation to $$\text{cut}(H_t, b_{t+1})/\text{sum}(H_t)$$

Knowing that $b_{t+1}$ induces a certain amount of Hamming-distance spread on any of the binary functions in $B_T$, $b_{t+1}$ is expected to induce good quality spread on Hamming distance $H_t$, which is the sum of all of these one-bit functions.

A method in accordance with such a SPEC-spread algorithm is further detailed in FIG. 4.

FIG. 4 is a flowchart of a method for training a hash function according to an embodiment.

In step 402, a generated affinity matrix is normalized. As an example, the affinity matrix generated in step 202 of flowchart 200 can be normalized by hash generator 120.

In step 404, a single-bit hash function is determined that minimizes the graph cut of the normalized affinity matrix while maximizing the sum of the pairwise Hamming distances. As an example, hash generator 120 determines a single bit hash function using the affinity matrix normalized in step 402.

In step 406, an additional single-bit hash function is determined function that minimizes the graph cut of the normalized affinity matrix while maximizing the entropy between the additional single-bit hash function and each previously-determined single-bit hash function, based on an evaluation of the Hamming distance spread by each individual previously-determined single-bit hash function.

In step 408, the additional single-bit hash function and all previously-determined single-bit hash functions are combined into a multi-bit hash function. As an example, hash generator 120 may combine the additional single-bit hash function and all previously-determined single-bit hash functions into a multi-bit hash function. In an embodiment, once step 408 is performed, method 400 returns to step 406 and continues to perform steps 406 and 408 until a specified number of bits are included in the multi-bit hash function.

Connection with Minimal Conditional Entropy: SPEC-Entropy Algorithm

In an embodiment, the conditional entropy $H(b_l|b_k)$ has a strong correlation with the Hamming distance spread $$\text{cut}(d_k, b_l)/\text{sum}(d_k).$$

As an example, the binary function $b_l$ that maximizes $H(b_l|b_k)$ will also be the maximal solution to $$(d_k, b_l)/\text{sum}(\{b_k\}).$$

Using $N$, $N_1$, $N_{11}$, and $N_{10}$ defined above, and set $N_0 = N - N_1$, $N_{01} = N_1 - N_{11}$, and $N_{00} = N_0 - N_{10}$, conditional entropy $H(b_1|b_k)$ can be computed as:

$$H(b_l|b_k) = -\frac{N_{11}}{N}\log\frac{N_{11}}{N_1} - \frac{N_{01}}{N}\log\frac{N_{01}}{N_1} - \frac{N_{10}}{N_1} - \frac{N_{10}}{N}\log\frac{N_{10}}{N_0} - \frac{N_{00}}{N}\log\frac{N_{00}}{N_0}$$

Based on this observation, another heuristic-based approximate algorithm that uses minimal conditional entropy to approximate the log term in (8) is:

$$\min_{b_{l+1}} \tilde{L}_{t+1} = \text{cut}_S(b_{t+1}) - \eta \max_{b_k \in B_l} H(b_{t+1}, b_k) \quad (9)$$

For given $b_{t+1}$, $\min_{b_k \in B_t} H(b_{t+1}|b_k)$ is the lower bound on the conditional entropies between $b_{t+1}$ and each of the binary functions in $B_t$. Minimizing the negative of this bound in (8) presents a constraint to maximizing this minimal conditional entropy. This can be further explained using mutual information.

Let $I(b_{t+1}, b_k)$ be the mutual information between $b_{t+1}$ and $b_k$. Because $H(b_{t+1}|b_k) = H(b_{t+1}) - I(b_{t+1}, b_k)$, (9) can be rewritten as:

$$\min_{b_{l+1}} \tilde{L}_{t+1} = \text{cut}_S(b_{t+1}) - \eta H(b_{t+1}) + \eta \max_{b_k \in B_l} I(b_{t+1}, b_k)$$

According to this equation, binary function $b_{t+1}$ should have small $\text{cut}_S(b_{t+1})$, large bit entropy $H(b_{t+1})$ and small mutual information with each of the binary functions in $B_T$, which is measured by the upper bound $\max_{b_k \in B_t} I(b_{t+1}, b_k)$. With such minimal mutual information constraints, the hash function learned by hash generator 120 can produce a compact code.

Figure 5:
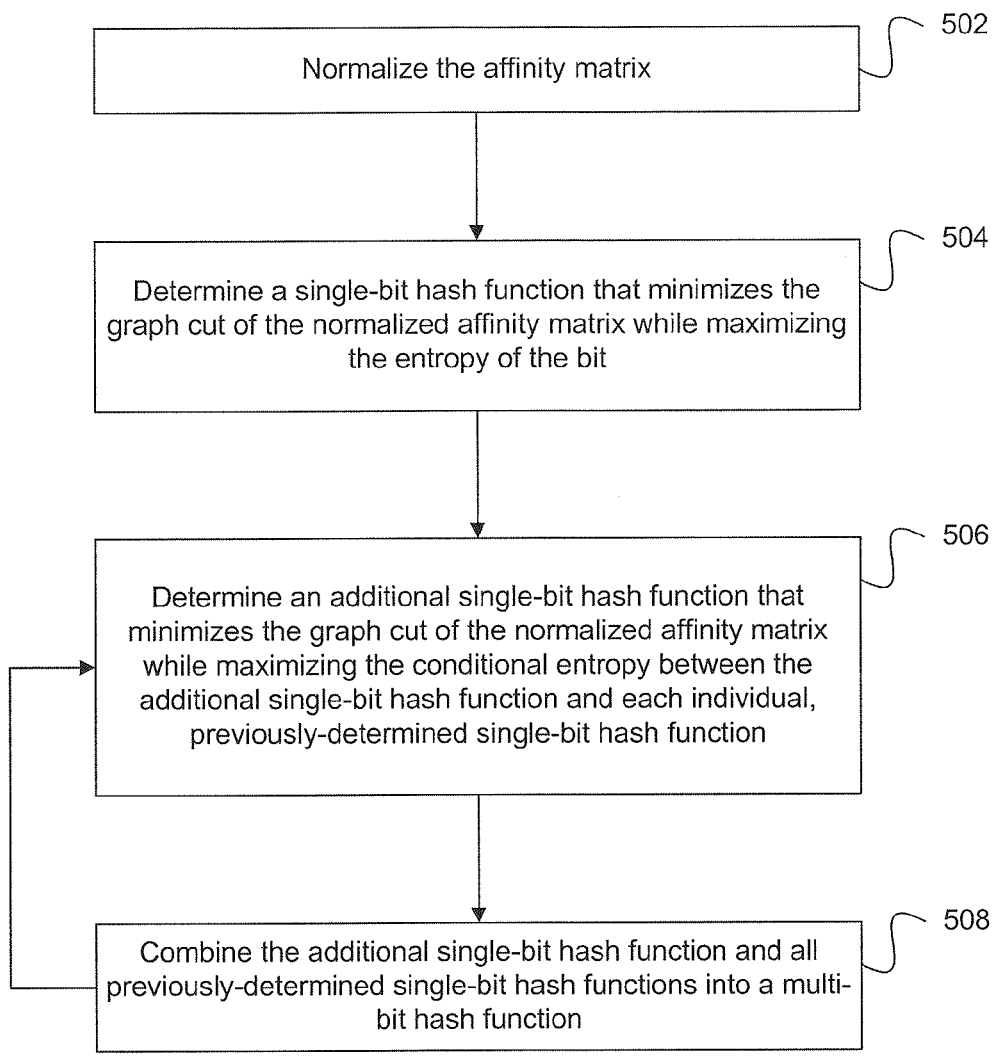
FIG. 5 is a flowchart of a method for training a hash function, according to yet another embodiment.

A method in accordance with such a SPEC-entropy algorithm is further detailed in FIG. 5.

In step 502, a generated affinity matrix is normalized. As an example, the affinity matrix generated in step 202 of flowchart 200 can be normalized by hash generator 120.

In step 504, a single-bit hash function is determined that minimizes the graph cut of the normalized affinity matrix while maximizing the entropy of the bit. As an example, hash generator 120 determines a single bit hash function using the affinity matrix normalized in step 502.

In step 506, an additional single-bit hash function is determined that minimizes the graph cut of the normalized affinity matrix while maximizing the conditional entropy between the additional single-bit hash function and each individual, previously-determined single-bit hash function.

In step 508, the additional single-bit hash function and all previously-determined single-bit hash functions are combined into a multi-bit hash function. As an example, hash generator 120 may combine the additional single-bit hash function and all previously-determined single-bit hash functions into a multi-bit hash function. In an embodiment, once step 508 is performed, method 500 returns to step 506 and continues to perform steps 506 and 508 until a specified number of bits are included in the multi-bit hash function.

III. Exemplary Implementation

The embodiments described above can be implemented using decision stumps as binary functions for hash code. In an embodiment, a decision stump performs binary classification by thresholding on a feature value. It can be computed fast, which is ideal for applications involving nearest neighbor search. Decision stumps may have a bounded hypothesis space. For a dataset with N objects and M feature dimensions, the number of hypotheses is $|H|=MN$. Using this property together with the special structure of the two hashing algorithms defined in (7) and (9), the learning time can be further reduced by hash generator 120 using dynamic programming.

Let H be the hypothesis space of decision stumps and $h \in H$ be one such stump. Because S is fixed, for each h, $cut_S(h)$ can be pre-computed by hash generator 120. The value can then be determined (using for e.g., a look-up table), rather than recomputed, during the learning process. Repeatedly evaluating $$\max_{b_k \in B_t} \mathrm{sum}(\{b_k, h\})$$

in (7) is particularly expensive, and this cost grows as t increases. However, by using the property $$\min_{b_k \in \{B_{t+1}\}} \mathrm{sum}(\{b_k, h\}) = \max\left(\min_{b_k \in B_t} \mathrm{sum}(\{b_k, h\}), \mathrm{sum}(\{b_{t+1}, h\})\right)$$

for each stump h, the value of $$\max_{b_k \in B_t} \mathrm{sum}(\{b_k, h\})$$

can be stored and updated by hash generator 120 using the recurrence above each time a new binary function is added to the hash function. This reduces the per-bit learning time from O(tMN) to O(MN). A similar method can be applied to compute min $$\min_{b_k \in B_t} H(b_{t+1} | b_k)$$

in (9).

IV. Exemplary Experiments

According to an embodiment of the invention, once the multi-bit hash function has been determined in step 204 of method 200, semantic nearest neighbors for objects in a feature space can be identified in step 206 of method 200. The performance of exemplary hash learning algorithms as discussed above has been evaluated on two tasks: retrieving semantically similar images from the LabelMe image database provided by the Massachusetts Institute of Technology Computer Science and Artificial Intelligence Laboratory, and performing nearest-neighbor recognition of celebrity face images.

LabelMe: Semantically-Similar Image Retrieval

The ability to quickly retrieve visually or semantically similar images from a large collection given a query image is becoming increasingly important in many visual search systems. Many sophisticated image similarity measures can be expensive to compute, thus prompting the interest in hashing-based approximations.

The first experimental dataset includes approximately 13,500 image thumbnails from the LabelMe dataset. Each image is represented using a 512-dimensional Gist feature vector. Ground truth similarity is obtained by calculating the L2 distance between these Gist vectors, and thresholding the values. The dataset was divided into a training set containing 80% of the samples, and a test set containing the remainder. After training, hash codes were computed for all samples. For each test sample, the nearest neighbors (based on Hamming distance between codes) were found from amongst the training samples, and performance was evaluated by measuring the precision and recall.

Performance is compared to two baseline algorithms. The first is the state of the art Spectral Hashing (Y. Weiss et al., Spectral Hashing, *Advances in Neural Information Processing Systems* 21, MIT Press, Cambridge, Mass., 2008, which is incorporated herein by reference in its entirety.) The second is a simple yet effective technique, which will be referred to herein as PCA hashing (see B. Wang et al., Efficient Duplicate image Detection Algorithm for Web Images and Large-Scale Database, Technical Report, Microsoft Research, 2005; and X.-J. Wang et al., Annosearch: Image Auto-annotation by Search, *IEEE Conference on Computer Vision and Pattern Recognition*, vol. 2, pp. 1483-1490, 2006, each of which is incorporated herein by reference in its entirety). PCA hashing computes a k-bit hash code by projecting each sample to the k principal components of the training set, then binarizing the coefficients, by setting each to 1 if it exceeds the average value seen for the training set, and 0 otherwise. The inventors also tried applying the algorithms after first transforming the input Gist values using PCA.

Figure 6A:
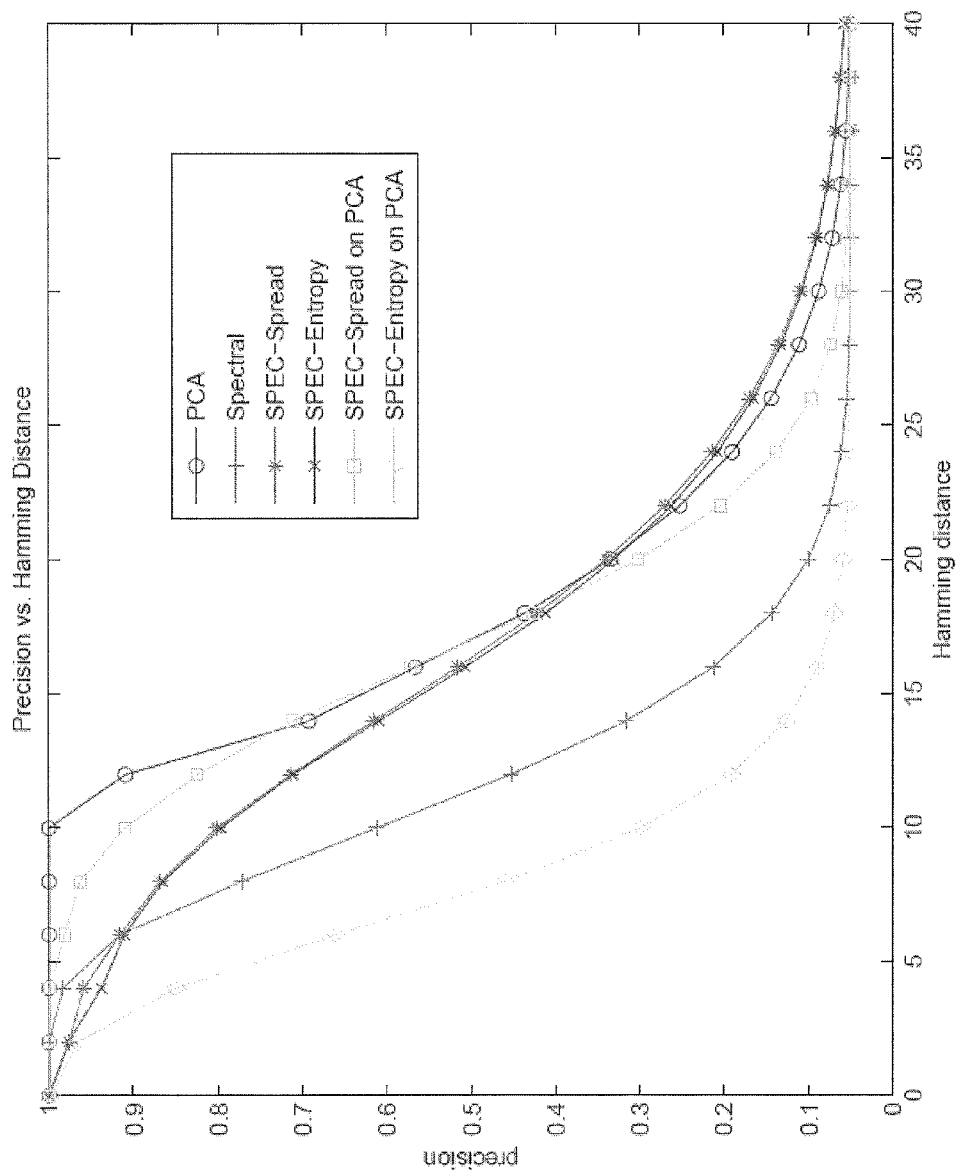
FIGS. 6A-6D are a set of plots comparing experimental results between a method according to an embodiment of the present invention and state-of-the-art methods of image retrieval.
Figure 6B:
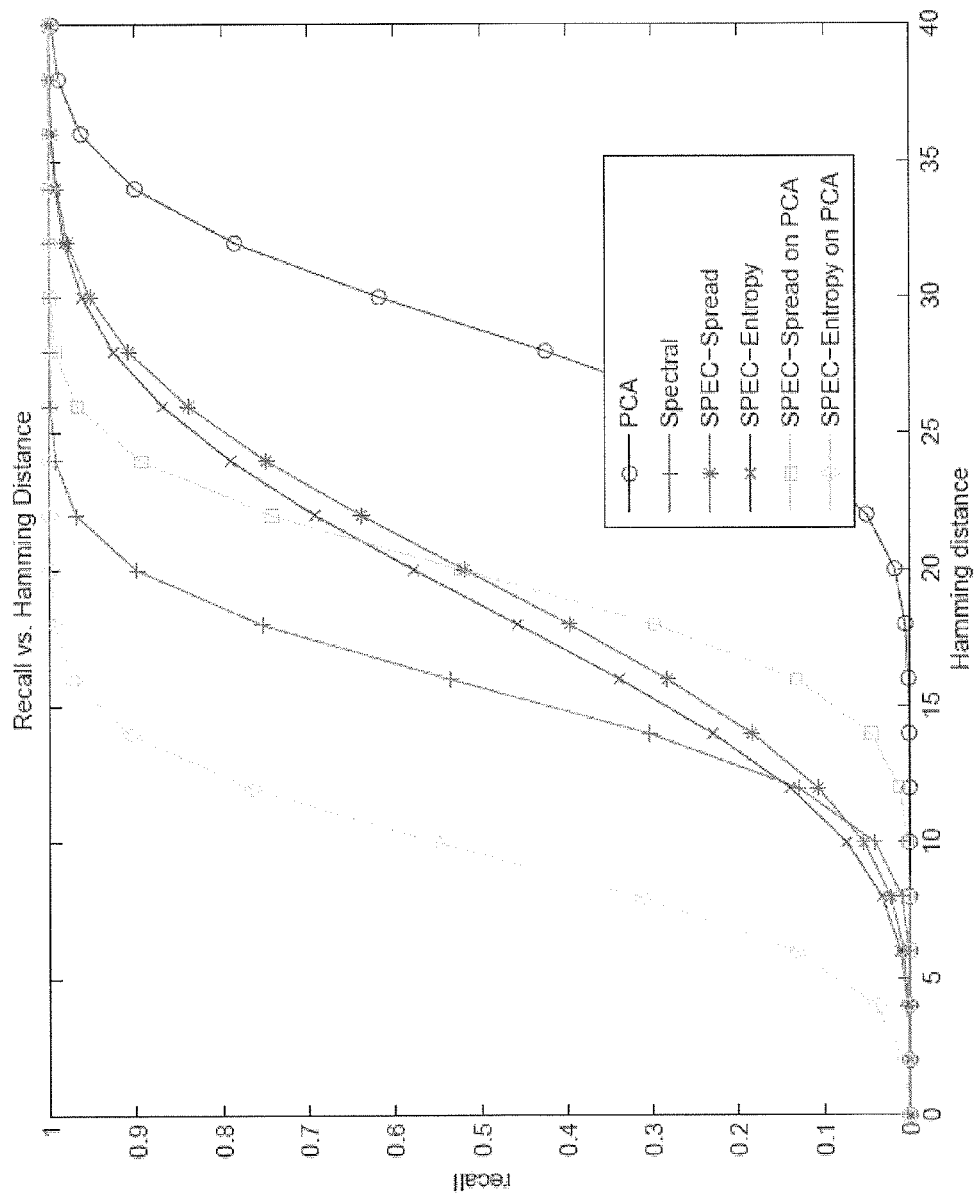
Figure 6C:
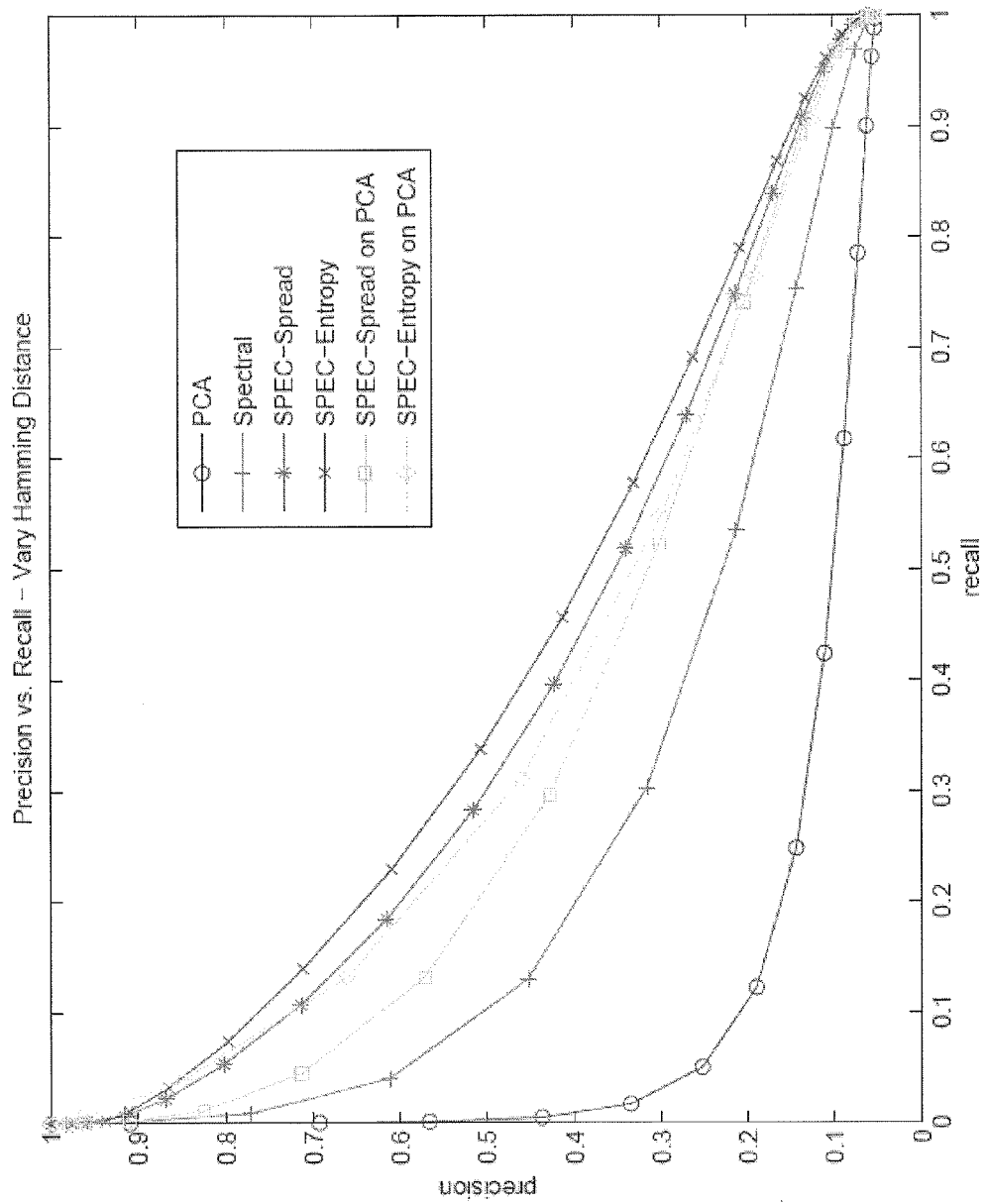
Figure 6D:
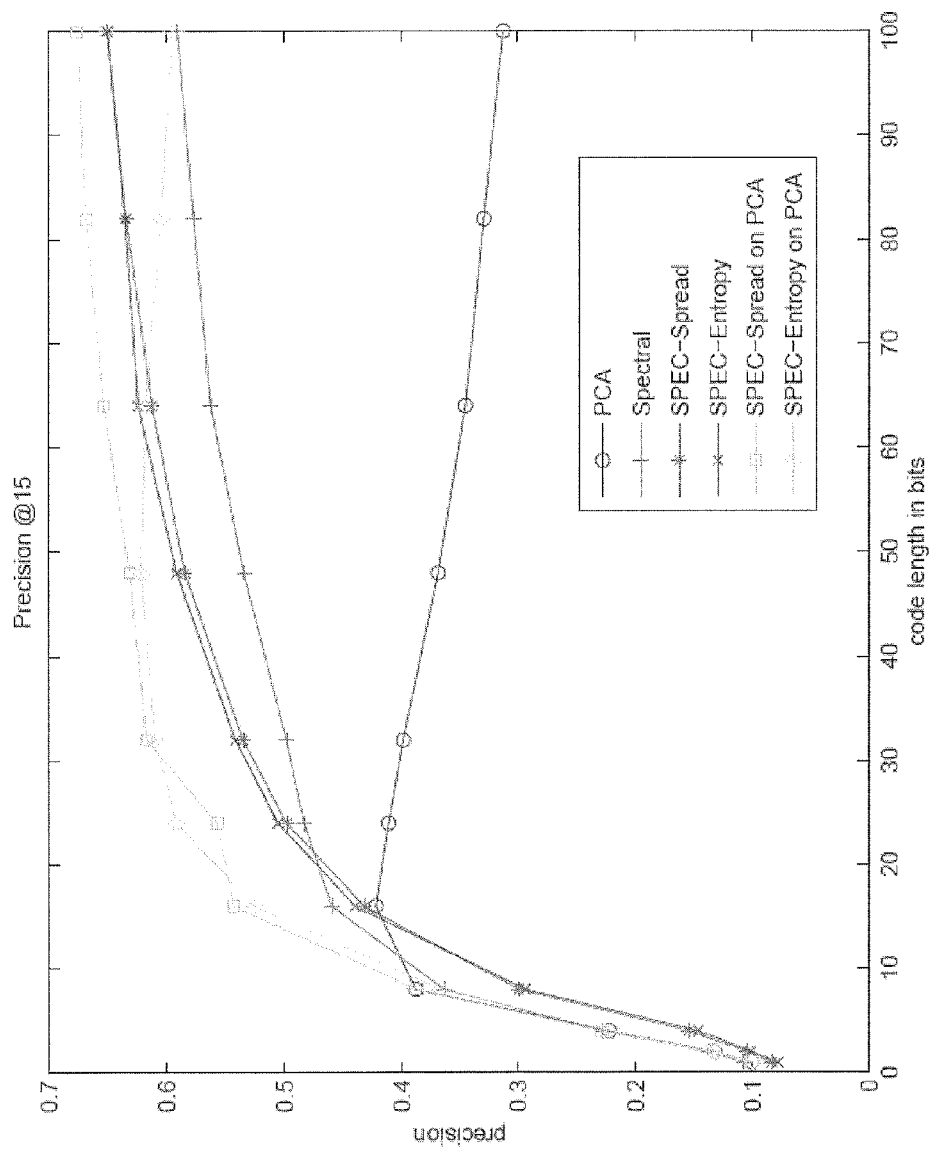

The results are displayed in FIGS. 6A though 6D. FIGS. 6A-6D are a comparisons of hashing algorithms on the LabelMe image retrieval task. For the first three plots, 64-bit hash codes were trained, measuring the performance when retrieving all samples within a fixed Hamming distance radius to the test images. The plots in FIGS. 6A-6D are as follows: FIG. 6A-*Precision* vs. Hamming radius; FIG. 6B—Recall vs. Hamming radius; FIG. 6C—Precision vs. Recall; FIG. 6D—a plot of precision within the top 15 nearest neighbors averaged over test images, as the code length in bits increases from 2 to 100 bits. The Precision vs. Recall plot (FIG. 6C) indicates that each of the SPEC algorithms which are embodiments of the present invention outperforms Spectral Hashing and PCA Hashing by a reasonable margin. Although training the SPEC algorithms of embodiments of the present invention on PCA-transformed input features did not seem to help with this specific performance measure, it did seem to be advantageous when comparing precision within the top 15 nearest results as shown in FIG. 6D.

Celebrity Face Recognition

An exemplary system and method for performing face recognition is described in U.S. patent application Ser. No. 12/172,939, filed Jul. 14, 2008, and titled "Method and System for Automated Annotation of Persons in Video Content," which is incorporated herein by reference in its entirety. When performing large scale face recognition, the computational cost of comparing a test face to a gallery of known faces can be considerable. One way to optimize the search for the nearest-neighboring face in the gallery is to convert all facial feature vectors to binary hash codes. Then, assuming Hamming distance between codes preserves semantic similarity—faces of the same subjects map to nearby codes—quick retrieval of a small collection of likely candidates is possible.

To evaluate the feasibility of learning such hashing functions, a set of approximately 280,000 face images were collected, each labeled with the name of the celebrity the image depicts. Each face is represented using a vector of 1000 real-valued features, obtained by applying Gabor filters at various facial landmark points, then performing LDA-style dimensionality reduction.

The dataset included 3387 celebrities, each with between 5 and 500 faces. The celebrities were split into two sets: a training set of 1684 celebrities, and a held-out set of 1703, with no intersection between the two. Each of these sets were further subdivided into a gallery, containing 70% of the faces, and a test set, containing the remaining 30%. The top performing algorithm from the LabelMe experiment, SPEC-Entropy, was trained on the gallery portion of the training celebrities, and hash codes were computed for the remaining faces. Ground truth similarity information was determined by matching the name used to label each face.

Test faces were recognized by returning the label of the nearest gallery sample, based on the Hamming distances between hash codes, and recognition accuracy was averaged across all testing samples. Although the baseline Neven Vision face recognition system was able to score 88.77% accuracy on the test set, the Neven Vision system requires a larger number of bits in a feature vector to obtain such accuracy. The results of the model according to an embodiment of the invention, based on the number of bits in each hash code, are as follows: 500 bits—85.72% accuracy; 750 bits—87.04% accuracy; 1000 bits—87.6% accuracy; 1250 bits—87.98% accuracy; 1500 bits—88.15% accuracy. Thus, it is possible using an embodiment of the present invention to achieve parity in recognition performance using a fraction of the number of bits used by the original feature vector. This provides benefits in terms of reduced storage, as well as greatly reducing the cost of nearest neighbor lookups from a large gallery.

V. Parallel SPEC Hash Learning

In an embodiment, the training set is re-arranged by hash generator 120. In an embodiment, hash generator 120 uses a 'MapReduce' framework to re-arrange data in the training set. MapReduce, developed by Google Inc., is known to those skilled in the art and is a framework for processing large datasets on certain kinds of distributable problems using a large number of computers (or nodes). As an example, a MapReduce framework includes a master node and a plurality of worker nodes. During a 'Map' stage, the master node receives an input problem, divides the input problem into smaller sub-problems, and distributes the sub-problems to worker nodes. A worker node may repeat the process of dividing the sub-problems into smaller problems, leading to a multi-level tree structure. In this way, worker nodes process sub-problems, and pass the results of the sub-problems back to their parent nodes or master node. During a 'Reduce' stage the master node then takes the answers to all the sub-problems and combines them to generate an answer to the original input problem received by the master node.

In an embodiment, a 'General Broadcast Reduce' framework is an iterative MapReduce framework. Thus, for example, in a general broadcast reduce framework, after completing all of the steps described above and obtaining a result of the original input problem, the master node broadcasts a message to all worker nodes (e.g., the answer to the problem), then starts again at the beginning, sending tasks to the workers and collecting their output. As an example, the master node may start again at the beginning to verify if the answer to the original input problem was correct.

In an embodiment, a 'join MapReduce' framework is a way of applying the MapReduce framework to two different sources of data. As an illustrative example, each task that a worker node processes includes of a pair of records (e.g., one record from data source 1 and the other record from data source 2).

In an embodiment, hash generator 120 indexes the input data (e.g., training data) records by sample ID values. In an embodiment, each record contains a list of feature index-value pairs with respect to a training sample. The output records may be keyed by feature indices, and each output record contains a list of sample index-feature value pairs with respect to the given feature index. In an embodiment, such output data is referred to as a feature value list(s).

In an embodiment, with the rearranged data, hash generator 120 generates a number of hypotheses from each feature value list using, for example, the MapReduce framework. As an example, a hypothesis is a binary classifier with a given classification threshold. In an embodiment, samples with feature values (of a given feature index) larger than the threshold may be classified as '1' and '0' if otherwise. In this way, the output generated by hash generator 120 is a set of hypothesis lists. Each hypothesis list includes all hypotheses of a given feature index.

In an embodiment, hash generator 120 computes the cut value of each hypothesis using, for example, the MapReduce framework. In an embodiment, each hypothesis needs to traverse the affinity matrix of the training set. For a large scale data set, this affinity matrix may be too large for memory and it may be time consuming to use look-up based methods to traverse the affinity matrix. Thus, to compute the cut value of each hypothesis, hash generator 120 may divide the affinity matrix into a number of blocks (e.g, a, b, c . . . etc.).

In an embodiment, hash generator 120 also divides the hypotheses into groups of hypothesis lists (e.g., A, B, C, etc.). In an embodiment, hash generator 120 may include two different mappers to map the number of blocks (e.g, a, b, c . . . etc.) and the hypothesis lists (A, B, C, . . . etc.) separately and in parallel.

Figure 7:
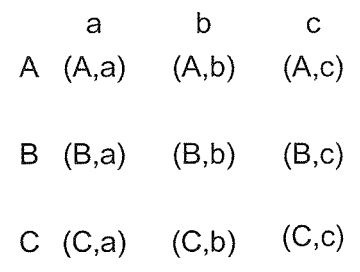

In an embodiment, hash generator 120 processes pairs of blocks and lists, such as (A,a), as shown in FIG. 7. As an example, such a processing operation may be accomplished by worker nodes within a MapReduce framework. After processing pairs of blocks and lists such as (A,a), (A,b), (A,c) . . . etc., as shown in FIG. 7, hash generator 120 aggregates the results of the processing to obtain a cut value of each hypothesis in hypothesis list A. In a similar manner, hash generator 120 may obtain a cut value of each hypothesis in hypothesis lists B and C. In an embodiment, such an aggregation of results may be accomplished by running another instance of the MapReduce framework.

Given the cut value of each hypothesis, hash generator 120 may initialize a general broadcast reduce framework to learn the SPEC hashing function. In an embodiment, a general broadcast reduce is an iterative process between master nodes and worker nodes in the MapReduce framework. In an embodiment, a master node selects a hypothesis and adds it to a hash function. In an embodiment, each worker node works on a group of hypothesis lists. At the start of each iteration, the master node sends information of the most recently selected hash bit to all worker nodes. Each worker node uses the information to update spread values of all its hypotheses. A worker node may then select the best (or optimal) hypothesis it has and return it to the master node. After receiving hypotheses from all worker nodes, the master node may select the best hypothesis and the iteration continues. In an embodiment, such an iterative learning process continues till the specified number of bits are included in the hash function generated by hash generator 120.

VI. Example Computer Embodiment

Figure 8:
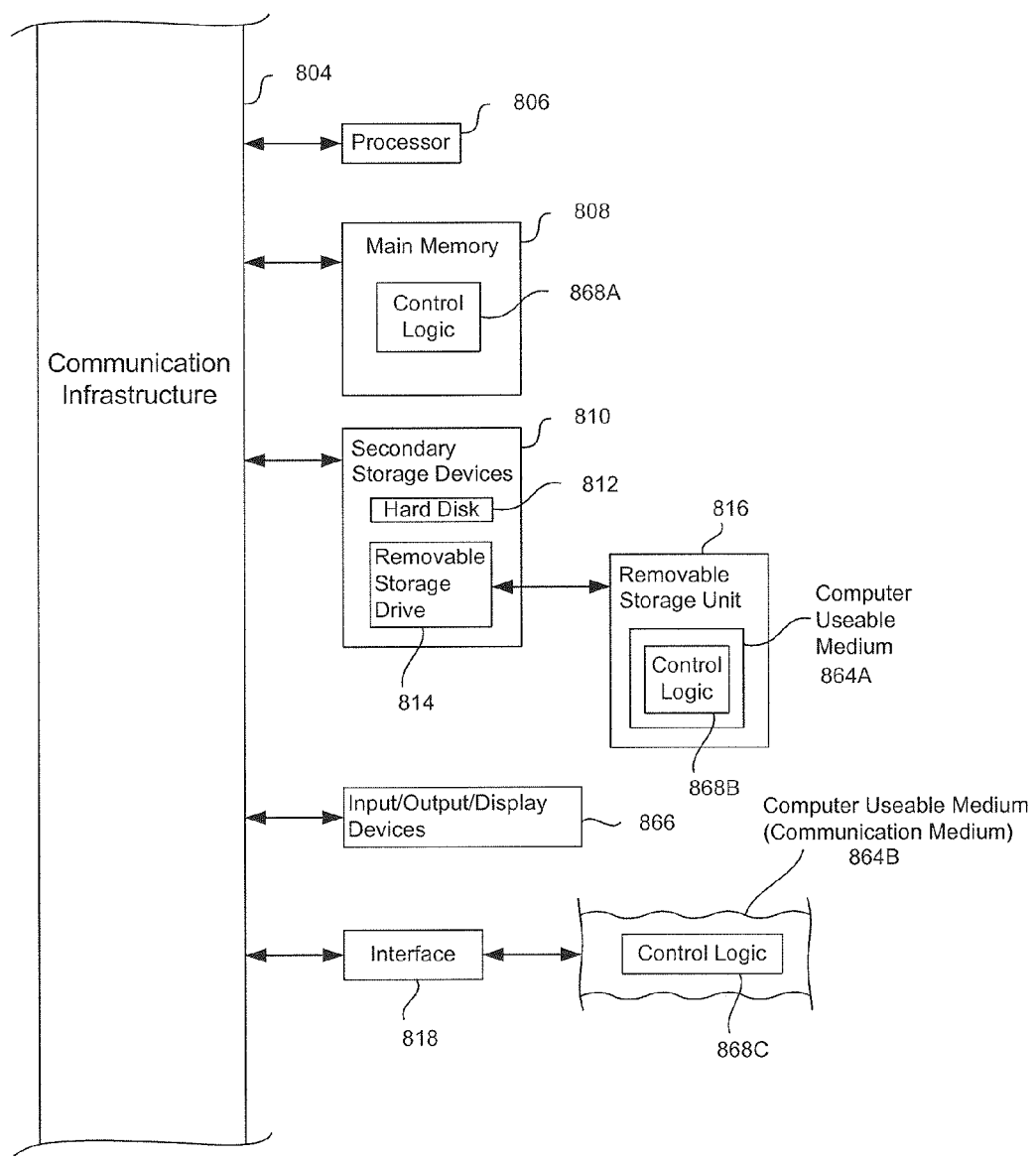
FIG. 8 illustrates an example computer useful for implementing components of the embodiments.

In an embodiment, the system and components of embodiments described herein are implemented using one or more computers, such as example computer 802 shown in FIG. 8. For example, hash generator 120 or similarity determiner 140 can be implemented using computer(s) 802.

Computer 802 can be any commercially available and well known computer capable of performing the functions described herein, such as computers available from International Business Machines, Apple, Oracle, HP, Dell, Cray, etc.

Computer 802 includes one or more processors (also called central processing units, or CPUs), such as a processor 806. Processor 806 is connected to a communication infrastructure 804.

Computer 802 also includes a main or primary memory 808, such as random access memory (RAM). Primary memory 808 has stored therein control logic 868A (computer software), and data.

Computer 802 also includes one or more secondary storage devices 810. Secondary storage devices 810 include, for example, a hard disk drive 812 and/or a removable storage device or drive 814, as well as other types of storage devices, such as memory cards and memory sticks. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 864A having stored therein computer software 868B (control logic) and/or data. Removable storage unit 816 represents a floppy disk, magnetic tape, compact disk, DVD, optical storage disk, or any other computer data storage device. Removable storage drive 814 reads from and/or writes to removable storage unit 816 in a well known manner.

Computer 802 also includes input/output/display devices 866, such as monitors, keyboards, pointing devices, Bluetooth devices, etc.

Computer 802 further includes a communication or network interface 818. Network interface 818 enables computer 802 to communicate with remote devices. For example, network interface 818 allows computer 802 to communicate over communication networks or mediums 864B (representing a form of a computer useable or readable medium), such as LANs, WANs, the Internet, etc. Network interface 818 may interface with remote sites or networks via wired or wireless connections.

Control logic 868C may be transmitted to and from computer 802 via communication medium 864B.

Any tangible apparatus or article of manufacture comprising a computer useable or readable medium having control logic (software) stored therein is referred to herein as a computer program product or program storage device. This includes, but is not limited to, computer 802, main memory 808, secondary storage devices 810 and removable storage unit 816. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments are applicable to both a client and to a server or a combination of both.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A computer implemented method for identifying semantic nearest neighbors in a feature space, comprising:
    generating, using one or more processors, an affinity matrix for objects in a given feature space, wherein the affinity matrix identifies the semantic similarity between each pair of objects in the feature space;
    training, using the one or more processors, a multi-bit hash function using a greedy algorithm that increases the Hamming distance between dissimilar objects in the feature space while minimizing the Hamming distance between similar objects; and
    identifying, using the one or more processors, semantic nearest neighbors for an object in a second feature space using the multi-bit hash function.

2. The method of claim 1, wherein said training a multi-bit hash function comprises:
    normalizing the affinity matrix;
    determining a single-bit hash function that minimizes the graph cut of the normalized affinity matrix while maximizing the sum of the pairwise Hamming distances;
    determining an additional single-bit hash function that minimizes the graph cut of the normalized affinity matrix while maximizing the entropy between the additional single-bit hash function and previously-determined single-bit hash functions, is based on an evaluation of Hamming distance spread by the sum of previously-determined single-bit hash functions; and
    combining the additional single-bit hash function and all previously-determined single-bit hash functions into a multi-bit hash function.

3. The method of claim 1, wherein said training a multi-bit hash function comprises:
    normalizing the affinity matrix;
    determining a single-bit hash function that minimizes the graph cut of the normalized affinity matrix while maximizing the sum of the pairwise Hamming distances;
    determining an additional single-bit hash function that minimizes the graph cut of the normalized affinity matrix while maximizing the entropy between the additional single-bit hash function and each previously-determined single-bit hash function, based on an evaluation of the Hamming distance spread by each individual previously-determined single-bit hash function; and
    combining the additional single-bit hash function and all previously-determined single-bit hash functions into a multi-bit hash function.

4. The method of claim 1, wherein said training a multi-bit hash function comprises:
normalizing the affinity matrix;
determining a single-bit hash function that minimizes the graph cut of the normalized affinity matrix while maximizing the entropy of the bit;
determining an the additional single-bit hash function that minimizes the graph cut of the normalized affinity matrix while maximizing the conditional entropy between the additional single-bit hash function and each individual, previously-determined single-bit hash function; and
combining the additional single-bit hash function and all previously-determined single-bit hash functions into a multi-bit hash function.

5. The method of claim 1, wherein said training a multi-bit hash function comprises:
generating a plurality of hypotheses from a feature value list;
generating a set of hypothesis lists using the hypotheses, where each hypothesis list includes hypotheses of a given feature index;
dividing the affinity matrix into a plurality of blocks;
dividing the set of hypothesis lists into groups of hypothesis lists;
mapping the blocks and the groups of hypothesis lists in parallel;
processing pairs of the blocks and the groups of hypothesis lists; and
aggregating the results of the processing to obtain a graph cut value of each hypothesis in a hypothesis list.

6. The method of claim 5, further comprising:
selecting a hypothesis from the hypothesis lists;
adding the hypothesis to the multi-bit hash function;
updating values of the hypotheses using the most recently selected bit in the multi-bit hash function; and
performing the selecting, the adding and the updating until a specified number of bits are included in the multi-bit hash function.

7. A process system for identifying semantic nearest neighbors in a feature space, comprising:
a memory; and
at least one processor coupled to the memory and configured to:
generate an affinity matrix for objects in a given feature space and train a multi-bit hash function using a greedy algorithm that increases the Hamming distance between dissimilar objects in the feature space while minimizing the Hamming distance between similar objects, wherein the affinity matrix identifies the semantic similarity between each pair of objects in the feature space; and
identify semantic nearest neighbors for an object in a second feature space using the multi-bit hash function.

8. The system of claim 7, wherein the at least one processor coupled to the memory is further configured to store the objects and a plurality of data sets.

9. An article of manufacture including a non-transitory computer-readable medium having instructions stored thereon that, when executed by a processing device, cause said processing device to perform operations comprising:
generating, using one or more processors, an affinity matrix for objects in a given feature space, wherein the affinity matrix identifies the semantic similarity between each pair of objects in the feature space;
training, using the one or more processors, a multi-bit hash function using a greedy algorithm that increases the Hamming distance between dissimilar objects in the feature space while minimizing the Hamming distance between similar objects; and
identifying, using the one or more processors, semantic nearest neighbors for an object in a second feature space using the multi-bit hash function.

10. The article of manufacture of claim 9, said training a multi-bit hash function comprising:
normalizing the affinity matrix;
determining a single-bit hash function that minimizes the graph cut of the normalized affinity matrix while maximizing the sum of the pairwise Hamming distances;
determining an additional single-bit hash function that minimizes the graph cut of the normalized affinity matrix while maximizing the entropy between the additional single-bit hash function and previously-determined single-bit hash functions, based on an evaluation of Hamming distance spread by the sum of previously-determined single-bit hash functions; and
combining the additional single-bit hash function and all previously-determined single-bit hash functions into a multi-bit hash function.

11. The article of manufacture of claim 9, said training a multi-bit hash function comprising:
normalizing the affinity matrix;
determining a single-bit hash function that minimizes the graph cut of the normalized affinity matrix while maximizing the sum of the pairwise Hamming distances;
determining an the additional single-bit hash function that minimizes the graph cut of the normalized affinity matrix while maximizing the entropy between the additional single-bit hash function and each previously-determined single-bit hash function, is based on an evaluation of the Hamming distance spread by each individual previously-determined single-bit hash function; and
combining the additional single-bit hash function and all previously-determined single-bit hash functions into a multi-bit hash function.

12. The article of manufacture of claim 9, said training a multi-bit hash function comprising:
normalizing the affinity matrix;
determining a single-bit hash function that minimizes the graph cut of the normalized affinity matrix while maximizing the entropy of the bit;
determining an additional single-bit hash function that minimizes the graph cut of the normalized affinity matrix while maximizing the conditional entropy between the additional single-bit hash function and each individual, previously-determined single-bit bash function; and
combining the additional single-bit hash function and all previously-determined single-bit hash functions into a multi-bit hash function.

13. The article of manufacture of claim 9, said training a multi-bit hash function comprising:
generating a plurality of hypotheses from a feature value list;
generating a set of hypothesis lists using the hypotheses, where each hypothesis list includes hypotheses of a given feature index;
dividing the affinity matrix into a plurality of blocks;
dividing the set of hypothesis lists into groups of hypothesis lists;
mapping the blocks and the groups of hypothesis lists in parallel;
processing pairs of the blocks and the groups of hypothesis lists; and aggregating the results of the processing to obtain a graph cut value of each hypothesis in hypothesis list.

14. The article of manufacture of claim 13, said operations further comprising:
selecting a hypothesis from the hypothesis lists;
adding the hypothesis to the multi-bit hash function;
updating values of the hypotheses using the most recently selected bit in the multi-bit hash function; and
performing the selecting, the adding and the updating till a specified number of bits are included in the multi-bit hash function.

* * * * *